United States Patent [19]

Deschner

[11] Patent Number: 5,433,313
[45] Date of Patent: Jul. 18, 1995

[54] DEVICE FOR TRANSPORTING FURNACE-HEATED PRODUCTS, PARTICULARLY HOLLOW GLASSWARE TO BE TRANSPORTED FROM A GLASSMAKING MACHINE

[75] Inventor: Heinrich Deschner, Eime, Germany

[73] Assignee: Mannesmann Aktiengesellschaft, Dusseldorf, Germany

[21] Appl. No.: 113,219

[22] Filed: Aug. 27, 1993

[30] Foreign Application Priority Data

Aug. 31, 1992 [DE] Germany .................. 42 29 055.4

[51] Int. Cl.⁶ ............................................ B65G 17/06
[52] U.S. Cl. .................................... 198/851; 198/850
[58] Field of Search .......... 198/850, 851, 853, 803.01, 198/803.14, 803.15

[56] References Cited

U.S. PATENT DOCUMENTS

| | | | |
|---|---|---|---|
| 1,414,212 | 4/1922 | Samuelson | 198/850 |
| 1,809,054 | 6/1931 | Mattison | 198/853 X |
| 2,743,003 | 4/1956 | Allen | 198/851 |
| 2,986,387 | 5/1961 | Illing | 198/851 X |
| 4,026,410 | 5/1977 | Korting | 198/851 |
| 4,167,999 | 9/1979 | Haggerty | 198/851 |
| 4,582,972 | 4/1986 | Curtin et al. | 198/851 X |

FOREIGN PATENT DOCUMENTS

| | | | |
|---|---|---|---|
| 0093108 | 4/1987 | Japan | 198/850 |
| 0304381 | 1/1929 | United Kingdom | 198/851 |

Primary Examiner—James R. Bidwell
Attorney, Agent, or Firm—Cohen, Pontani, Lieberman, Pavane

[57] ABSTRACT

A device for transporting furnace-heated products, particularly hollow glassware to be transported from a glassmaking machine, e.g. a molding machine, to one or more annealing or cooling ovens, has a toothed-chain conveyor on which the furnace-heated product rests on a standing surface. The standing surface of the toothed-chain conveyor is formed from heat-insulating ceramic elements and the ceramic elements are arranged on special pins which project through openings in special tooth plates arranged in the toothed-chain conveyor.

6 Claims, 2 Drawing Sheets

DEVICE FOR TRANSPORTING FURNACE-HEATED PRODUCTS, PARTICULARLY HOLLOW GLASSWARE TO BE TRANSPORTED FROM A GLASSMAKING MACHINE

BACKGROUND OF THE INVENTION

1. Field of the Invention

The present invention relates to a device for transporting furnace-heated products, particularly hollow glassware to be transported from a glassmaking machine, e.g. a molding machine, to one or more annealing or cooling ovens.

2. Description of the Prior Art

In transporting devices as discussed above, it is known to form a surface with toothed-chain conveyors, the furnace-heated product resting on the upper portion of the toothed-chain conveyor by a standing surface. While the hot glassware which has just been formed in the molding machine is being transported between the molding machine and cooling oven, more heat escapes at its standing surface than at the rest of its surface which, in the case of thin-walled products, can lead to stresses and in some instances to cracks in the vicinity of the standing surface. The differences in tension therefore arise from disparate cooling ratios in the base and shaft regions of the hot product. This is because the known toothed-chain conveyors extract more heat from the hot product at the standing surface due to the heat conduction of the metal than can be given off by the remaining surface to the surrounding air as a result of heat radiation. This results in essentially two different cooling speeds which cause tension in the product and in extreme cases stress cracks in the glass. For this reason, direct contact between the hot glassware and the conventional steel toothed-chain conveyor with its relatively high heat conducting capacity is disadvantageous.

SUMMARY OF THE INVENTION

Accordingly, it is an object of the present invention to provide a transporting device in which the above-mentioned tensions in the hot product are prevented or at least reduced.

Pursuant to this object, and others which will become apparent hereafter, one aspect of the present invention resides in forming the standing surface of the conveyor from heat-insulating ceramic elements.

The advantages achieved by the invention consist in particular in preventing the heat conduction formerly taking place at the standing surface and bringing about a more uniform removal of heat in the standing region and shaft region of the product so that high tensions can no longer occur in the workpiece. In like manner, the great differences in tension which particularly result in damage to the hot product are also done way with. Also, thermal shock no longer takes place to such a great extent when transferring to the toothed-chain conveyor, since the ceramic elements only give off heat slowly and the temperature of the surface of the chain conveyor therefore does not correspond to that of metal. Furthermore, because of their low heat-conducting capacity, the ceramic elements extensively prevent the flowing off of heat into the toothed-chain located underneath them, so that the toothed chain is no longer heated as was formerly the case.

Special advantages are derived from a division of functions resulting from the present invention. The transporting function is assumed by the ceramic elements, while the function of "absorbing stresses" is now left to the chain line. This division of functions enables the two components to be accommodated independently and accordingly in optimal fashion to the transporting task at hand as regards the particular product to be transported.

In another embodiment of the invention, the ceramic elements have cleats that extend transversely to the transporting direction and form a uniform plane on the back of the upper portion of the toothed-chain conveyor, a groove being formed between every two cleats. The surface coming into contact with the transported goods is accordingly smaller than would be the case with a smooth surface.

In a construction which is favorable for ceramics, the distance between the cleats is adapted to the standing surface of the furnace-heated product and the cross-sectional profile of the cleats and grooves is approximately trapezoidal.

The fastening of the ceramic elements is benefitted in that special tooth plates defining the width of the toothed-chain conveyor are provided in addition to the main tooth plates, bearing pins and cradle pins forming the toothed-chain conveyor. Special pins which are guided through the openings of the ceramic elements and whose cross section imitates the cross section of the opening extend into these special tooth plates.

Pursuant to a further embodiment, successive ceramic elements in the transporting direction have a stepped border at one end which faces forward and is curved at the top and an inwardly curved border at a second end. The successive ceramic parts form borders which fit one inside the other with an intervening space and the ceramic elements can be deflected proceeding from the center point of a chain link. As a result of this shaping, gaps in which foreign objects could jam are prevented from occurring between two successive ceramic elements even when the ceramic elements are angled, i.e. when running on the chain wheel. The surfaces of the ceramic elements above the overlapping region are beveled in such a way as to repel foreign objects.

Another construction consists in that the curves of the borders describe circular arcs, the upper border being constructed so as to be smaller than the inwardly shaped border.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
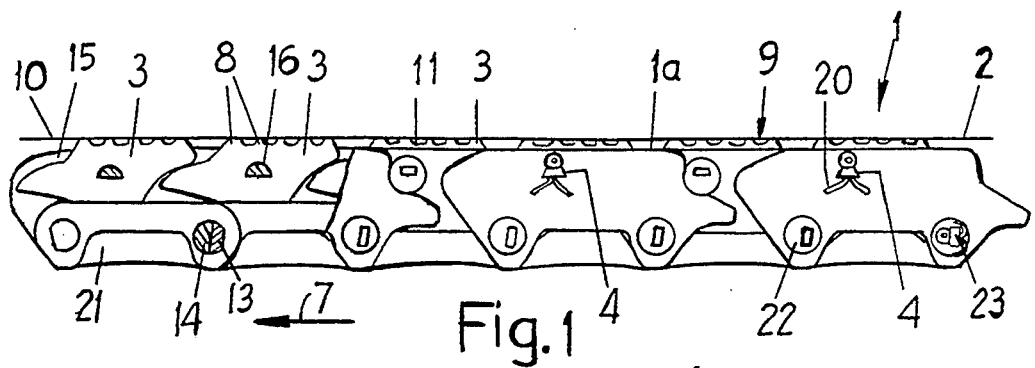
FIG. 1 shows a side view of the inventive device.
Figure 2:
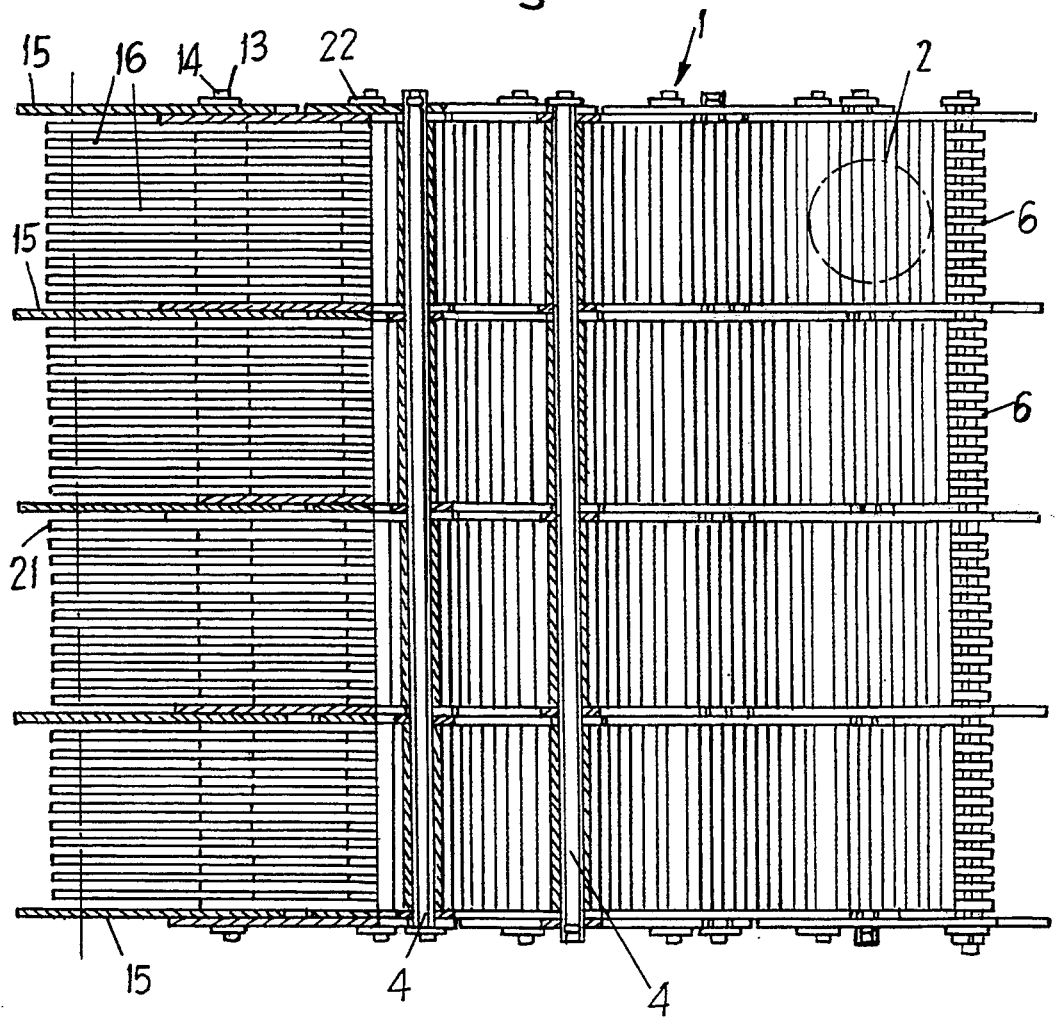
FIG. 2 shows a top view according to FIG. 1.

The device for transporting furnace-heated products, e.g. hollow glassware, is substantially formed by a toothed-chain conveyor 1. Standing surfaces 2 for the hollow glassware are provided on the surface of the toothed-chain conveyor 1.

In this case, however, the standing surface 2 is formed from heat-insulating ceramic elements 3. These ceramic elements 3 are arranged on special pins 4 which are supported in the toothed-chain conveyor 1 so as to be fixed with respect to rotation relative thereto. The ceramic elements 3 have openings 5 through which the special pins 4 are inserted. The special tooth plates 15 also have such openings 5 which are penetrated by the special pins 4.

The ceramic elements 3 are provided with cleats 8 which extend transversely to the transporting direction 7 and form a uniform plane 10 on the back 9 of the upper portion 1a of the toothed-chain conveyor 1. A groove 11 is provided between every two cleats 8.

The distance between the cleats 8 can be adapted to the standing surface 2 of the furnace-heated product. The cross-sectional profile of the cleats 8 and the grooves 11 is constructed so as to be roughly trapezoidal.

The toothed-chain conveyor 1, considered in its entirety, is formed from the tooth plates 6, bearing pins 13, cradle pins 14 and special tooth plates 15 defining the width of the toothed-chain conveyor 1. The aforementioned openings 5 for the ceramic elements 3 and the special pins 4 are guided through these special tooth plates 15 which project over the tooth plates 6 as can be seen in FIG. 1. A cross section 16 of the special pins 4 is adapted to the cross section 5a of the opening 5.

Figure 3:
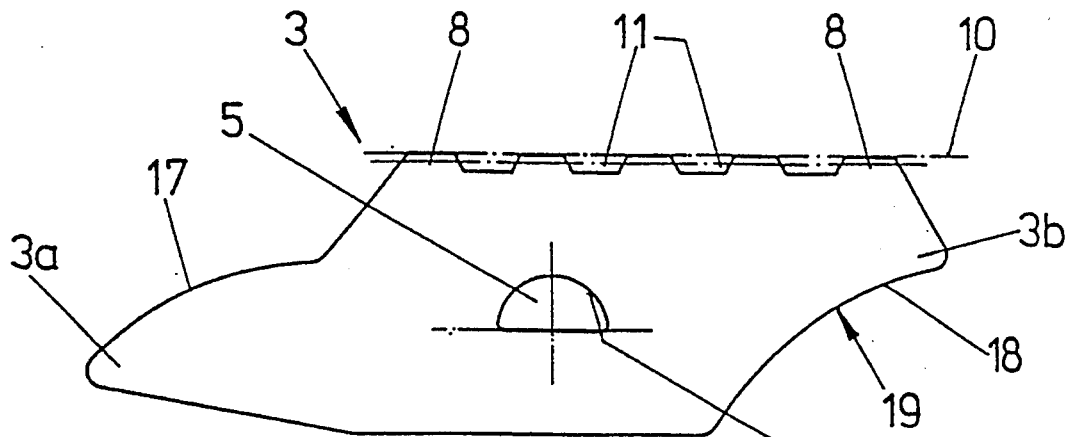
FIG. 3 shows a side view of the ceramic element in enlarged scale.
Figure 4:
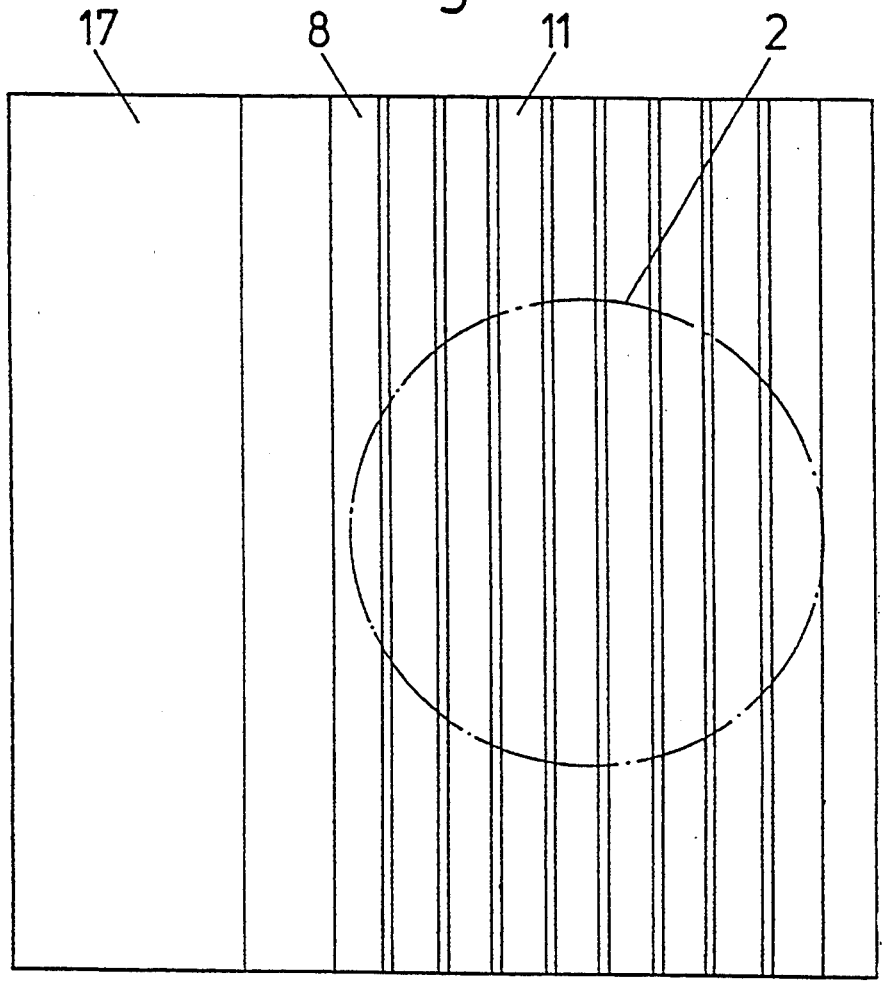
FIG. 4 shows the top view according to FIG. 3.

The successive ceramic elements 3 in the transporting direction 7 are shown in an enlarged view in FIGS. 3 and 4 so that details may be more easily recognized. One end 3a of the ceramic element 3 has a stepped border 17 which faces forward and is curved at the top, and there is an inwardly shaped, curved border 18 at a second end 3b. The successive ceramic parts 3 form borders 17 and 18 which project one inside the other. These borders 17 and 18 are designed so that two adjacent ceramic elements can move relative to one another when the toothed-chain conveyor 1 is moved around the axis by the radius of a chain For this purpose, each curve of the borders 17 and 18 describes a circular arc 19, the upper border 17 being constructed so as to be smaller than the inwardly shaped border 18 so that no friction can occur during relative movement.

FIG. 3 also shows the circular arc 19 whose center point forms the axis of a chain link. Further, the special pins 4 are secured by split-pins 20 (FIG. 1). A guide bar is designated by 21. All bearing pins 13 and cradle pins 14 are fastened by rivet disks 22. On the other hand, the bearing pins 13 can also be axially secured by means of split-pin fasteners 23.

The invention is not limited by the embodiments described above which are presented as examples only but can be modified in various ways within the scope of protection defined by the appended patent claims.

I claim:

1. A device for transporting furnace-heated products to be transported in a transporting direction from a glassmaking machine to at least one annealing or cooling oven, comprising: a toothed-chain conveyor having a standing surface on which the furnace-heated product rests, the standing surface being formed from heat-insulating ceramic elements, the toothed-chain conveyor including a plurality of toothed plates having teeth; special plates, in addition to the plurality of toothed plates, arranged in the toothed-chain conveyor and having teeth and through-openings; special pins which project through the through openings, the ceramic elements being arranged directly on the special pins which project through the openings in the special toothed plates; and bearing pins and cradle pins, separate from the special pins, arranged to connect together the plurality of toothed plates and the special plates.

2. A device according to claim 1, wherein the ceramic elements have a plurality of cleats which extend transversely to the transporting direction and form a uniform plane on the back of an upper portion of the toothed-chain conveyor, and form a groove between every two cleats.

3. A device according to claim 2, wherein the cleats are separated by a distance that is adapted to the standing surface for the furnace-heated product, the cleats and the grooves having cross-sectional profiles that are approximately trapezoidal.

4. A device, according to claim 1, wherein the special toothed plates are provided in addition to the toothed plates so as to define the width of the toothed-chain conveyor, the special pins having a cross-section that imitates a cross section of the opening in the special toothed plates.

5. A device according to claim 1, wherein each of the ceramic elements in the transporting direction have a first end with a stepped border that faces forward and is curved on top, and a second end with an inwardly shaped, curved border so that successively arranged ceramic elements form borders which fit one inside the other with an intervening gap so as to permit deflection of the ceramic elements proceeding from a center point of a chain link.

6. A device according to claim 5, wherein the curves of the borders describe circular arcs in each instance, the curved, stepped border being smaller than the inwardly shaped border.

* * * * *